US008087806B2

United States Patent
Chang

(10) Patent No.: US 8,087,806 B2
(45) Date of Patent: Jan. 3, 2012

(54) ELECTRONIC DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 120 days.

(21) Appl. No.: 12/718,060

(22) Filed: Mar. 5, 2010

(65) Prior Publication Data

US 2010/0308753 A1 Dec. 9, 2010

(30) Foreign Application Priority Data

Jun. 3, 2009 (CN) .......................... 2009 1 0302887

(51) Int. Cl.
*F21V 33/00* (2006.01)
(52) U.S. Cl. .................... 362/362; 362/253; 362/612
(58) Field of Classification Search .................. 362/362, 362/363, 254, 234, 612, 613
See application file for complete search history.

(56) References Cited

U.S. PATENT DOCUMENTS

| 5,136,483 | A | * | 8/1992 | Schoniger et al. | ............ | 362/545 |
| 2007/0133210 | A1 | * | 6/2007 | Watson et al. | ................ | 362/311 |
| 2009/0021960 | A1 | * | 1/2009 | Yeh et al. | ...................... | 362/612 |
| 2009/0040748 | A1 | * | 2/2009 | Kerr | ............................ | 362/154 |

* cited by examiner

*Primary Examiner* — Laura Tso
(74) *Attorney, Agent, or Firm* — Altis Law Group, Inc.

(57) ABSTRACT

An electronic device includes a main body, an illuminator received within the main body, a transparent rear cover attaches to the main body, a color tape, a key and a reflective film. The main body and the rear cover cooperatively define a compartment for receiving a battery therein. The color tape attaches to the inner surface of the rear cover. The illuminator is configured for illuminating the color tape on the inner surface of the rear cover. The key is arranged on the main body and connected to the illuminator for switching on/off the illuminator. The reflective film is adhered to the rear cover. The rear cover includes a covered portion with the reflective film attached thereon and an exposed portion free of the reflective film attached thereon.

6 Claims, 5 Drawing Sheets

ELECTRONIC DEVICE

BACKGROUND

1. Technical Field

The present disclosure relates to electronic devices, and particularly, to an electronic device with a color changeable casing.

2. Description of Related Art

With the development of electronic devices, such as cell phones, mp4s etc., people pay more and more attention to the appearance of the electronic devices now. In order to satisfy aesthetic requirements, electronic devices come in various colors. However, the color of the electronic device is usually unchangeable. In order to change the color of the electronic device, people usually need to change the casing of the electronic device.

Therefore, it is desirable to provide an electronic device to overcome the limitations described above.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
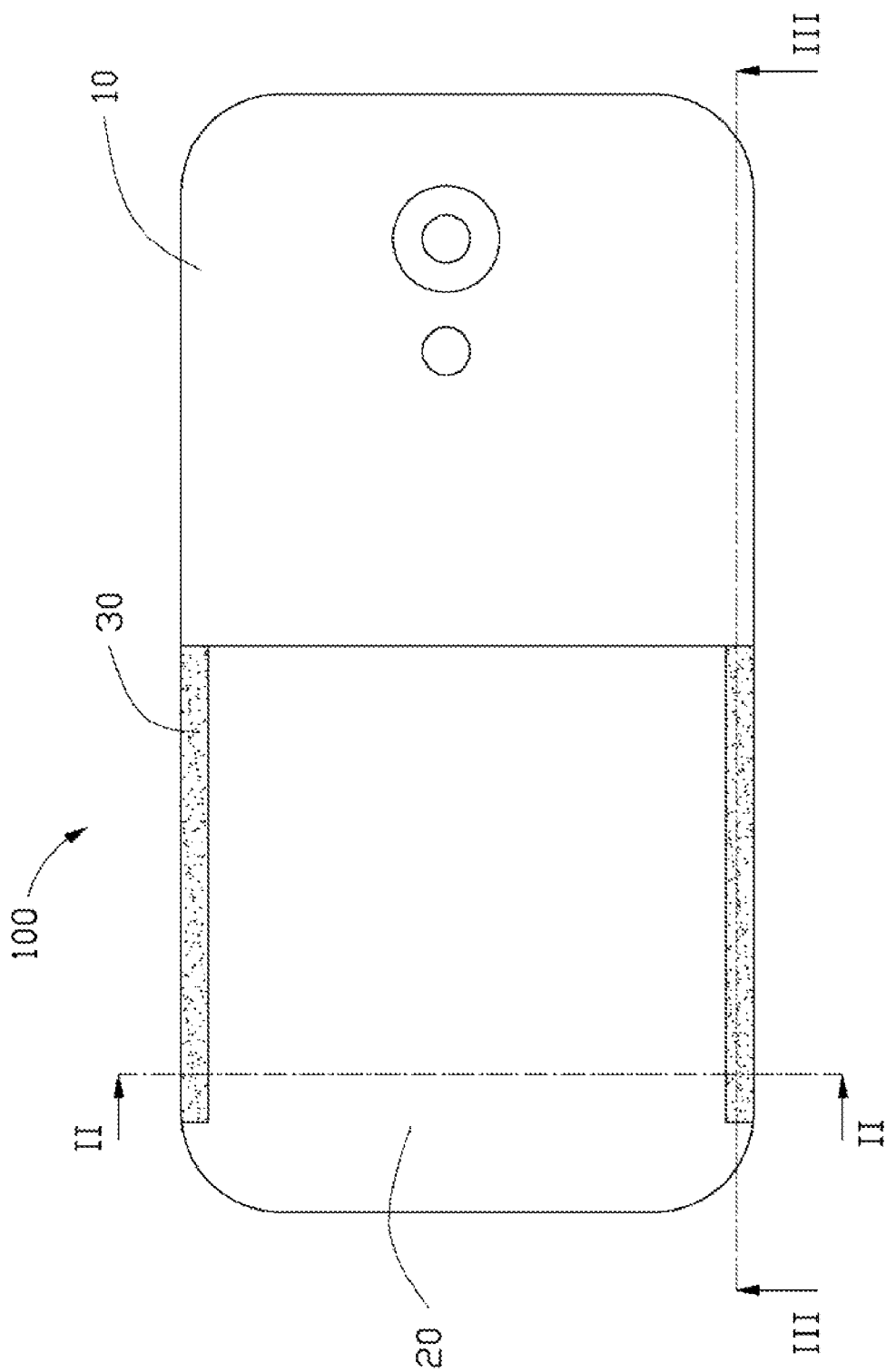
FIG. 1 is a schematic assembled view of an electronic device, according to an exemplary embodiment.
Figure 2:
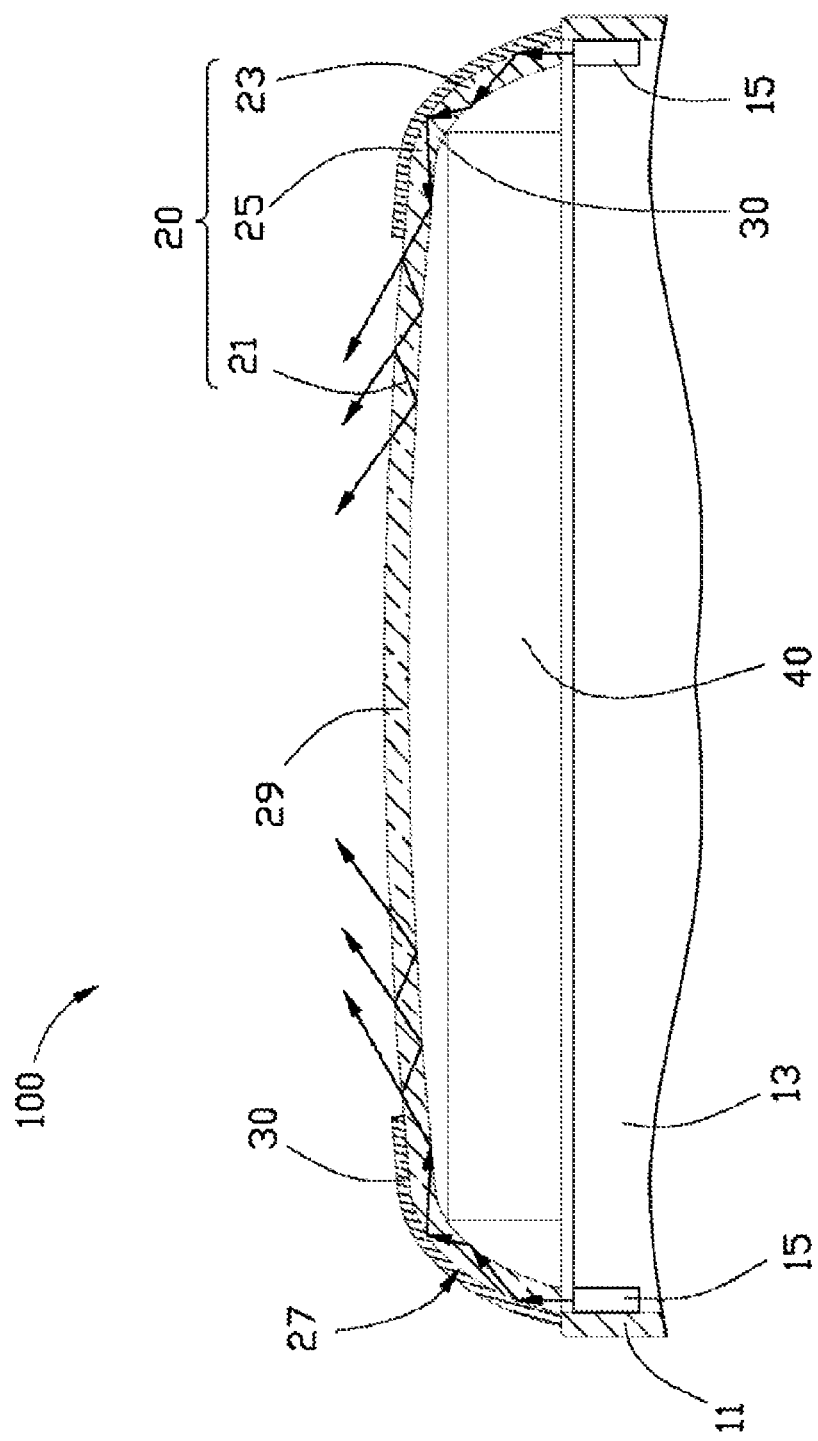
FIG. 2 is a cross-sectional view taken along line II-II of the electronic device of FIG. 1.
Figure 3:
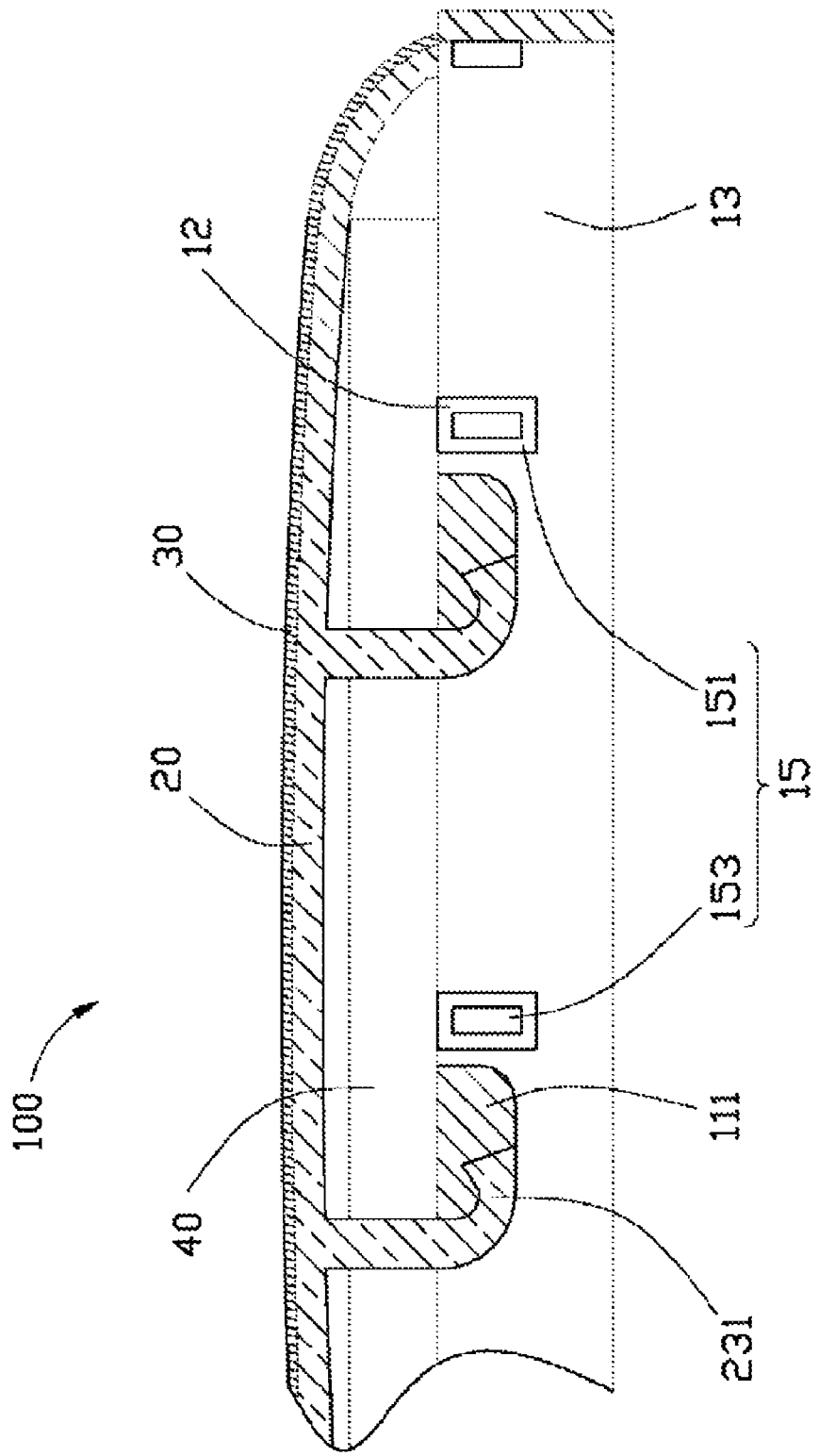
FIG. 3 is a cross-section view taken along line III-III of the electronic device of FIG. 1.

Referring to FIGS. 1 to 3, an electronic device 100 includes a main body 10, a transparent casing 20 covering the main body 10, and a reflective film 30 attached to the transparent casing 20. The electronic device 100 can be a cell phone, a camera or other portable electronic device. In the present disclosure, the electronic device 100 is a cell phone, the transparent casing 20 is a rear cover of the cell phone attached to the main body 10, the main body 10 and the rear cover cooperatively define a compartment for receiving a battery 40 therein.

The transparent casing 20 includes a rectangular top portion 21 and four side portions 23 smoothly extending from the edges of the top portion 21. The top portion 21 is parallel to the main body 10. In the present disclosure, the top portion 21 is coated with a film made of a hard material, e.g., SiO2, to increase the rigidity thereof. The side portions 23 are substantially perpendicular to the main body 10. The distal end of the side portion 23 includes a number of catches 231, to detachably catch the main body 10. Four curved portions 25 are formed between the side portions 23 and the top portion 21. In the present disclosure, the transparent casing 20 is made of plastic. Furthermore, the top portion 21 and the side portions 23 may be immixed with numerous reflective particles (not shown), for substantially dispersing light striking thereon.

The reflective film 30 is a total reflection film with multiple colors. The reflective film 30 can be tightly adhered on the surface of the transparent casing 20 by adhesive or static electricity. The transparent casing 20 includes a covered portion 27 with the reflective film 30 attached thereon and an exposed portion 29 free of the reflective film 30 attached thereon. In the present disclosure, the covered portion 27 includes the curved portions 25 and the reflective film 30 attached on the external surface of the covered portion 27. It is understood that, in alternative embodiments, the reflective film 30 also may be attached on the inner surface of the covered portion 27 or partially or entirely attached on both the external and the inner surfaces of the covered portion 27.

The main body 10 includes a securing shell 11 and a motherboard 13 secured in the securing shell 11. The securing shell 11 defines a number of latching grooves 111 in the sidewalls, for engagingly receiving the catches 231 of the transparent casing 20 therein.

The motherboard 13 includes at least one illuminator 15 located on the edge thereof. The at least one illuminator 15 can emit at least one color light for illuminating the transparent casing 20. The at least one illuminator 15 faces the opposite distal ends of the side portions 23, such that the color light can be emitted to the transparent casing 20 and then guided to the reflective film 30. In detail, the motherboard 13 defines a number of receiving grooves (not shown) for receiving the corresponding illuminators 15 therein. The receiving grooves are arranged in a line, thus the illuminators 15 can be aligned with each other in a line relative to the edge of the transparent casing 20. In the present disclosure, the illuminators 15 are light emitting diodes (LEDs) and may include different colors. In the present disclosure, the illuminators 15 include a red illuminator 151 for emitting red light and a green illuminator 153 for emitting green light.

Figure 4:
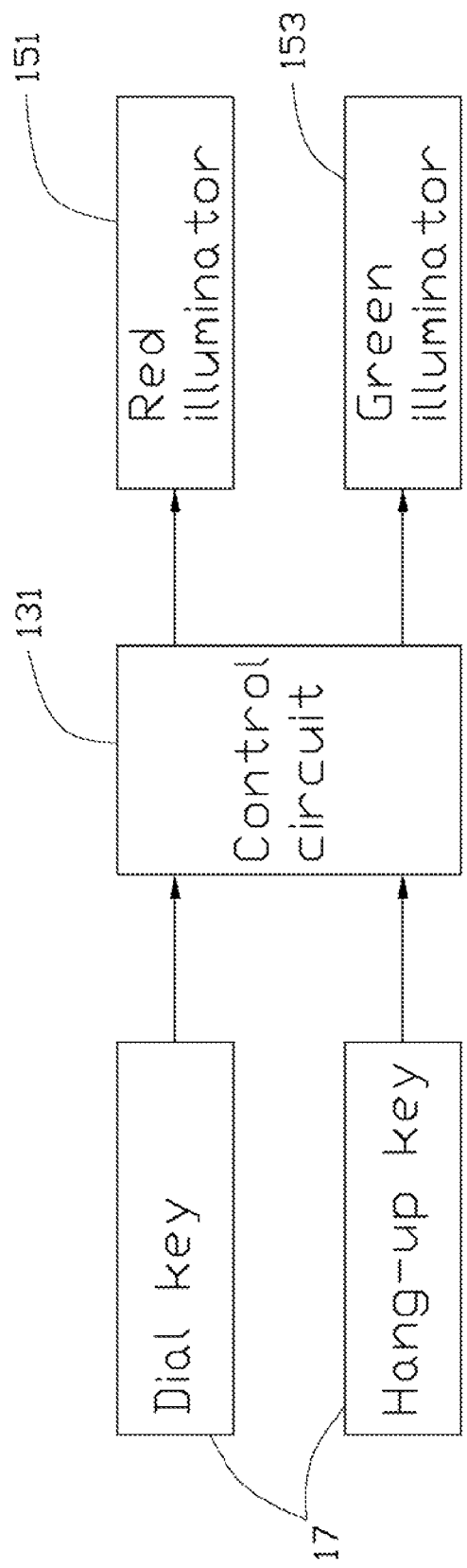
FIG. 4 is a functional block diagram of the electronic device of FIG. 1.

Referring to FIG. 4 together, the motherboard 13 includes a control circuit 131 configured to trigger the illuminators 15 to be turned on. The control circuit 131 electrically connects the illuminators 15 to a number of keys 17 which are arranged on the main body 10 and configured for switching on/off the illuminators 15. Pressure applied on the different keys 17 can cause the illuminators 15 to emit different color light to the transparent casing 20.

In the present disclosure, the keys 17 include a dial key and a hang-up key. The green illuminator 153 is connected to the dial key and the red illuminator 151 is connected to the hang-up key, both via the control circuit 131. As such, pressure applied on the dial key may cause the red illuminator 151 to emit red light and pressure applied on the hang-up key may cause the green illuminator 153 to emit green light. It is noteworthy, that the number of the illuminators 15 may be more than two, and the illuminators 15 also can be connected to the other keys 17, e.g. the numeral keys.

Referring again to FIG. 2, a light path of light rays incident into the transparent casing 20 of the electronic device 100 is shown. Light rays travel from the illuminators 15 through the transparent casing 20 to the reflective film 30. And then the reflective film 30 reflects the light rays, which can undergo color change because of the multicolored nature of the film 30. The light rays then travel within in the transparent casing 20 and may be internally reflected one or more times until it is reflected to the outside at which time it is refracted when passing from within the transparent casing 20 to the exterior air. As a result a user may see the transparent casing 20 undergoing many color changes in an attractive manner When the dial key is pressed, the green illuminator 153 emits green light to the transparent casing 20, and when the hang-up key is pressed, the red illuminator 151 emits red light to the transparent casing 20. The green light and the red light will be reflected and refracted as described above. As a result, the electronic device 100 will appear in various colors to the user.

Figure 5:
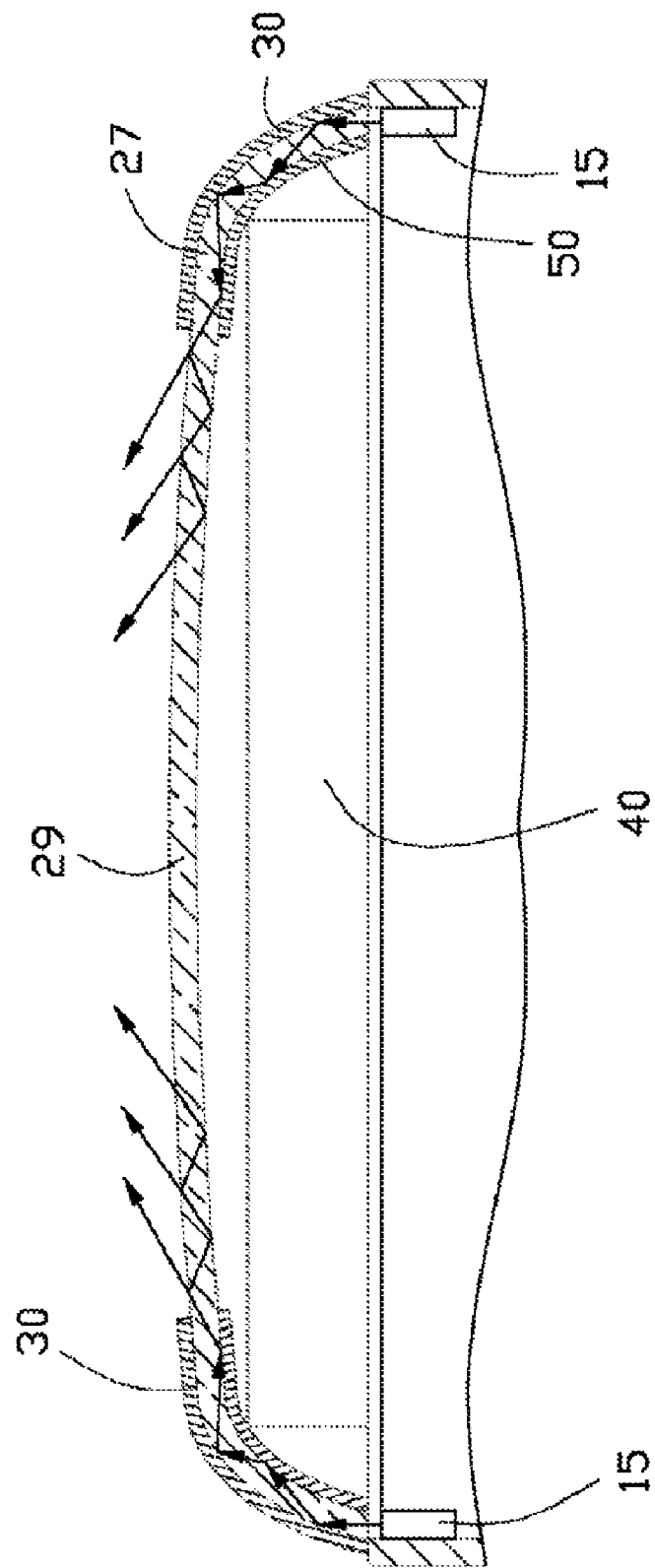
FIG. 5 is another cross-section view taken along line II-II of the electronic device of FIG. 1, according to another embodiment.

If the motherboard 13 just includes an illuminator 15, the illuminator 15 is color changeable in different time and may be controlled by the control circuit 131. Referring to FIG. 5, in another embodiment, the electronic device 100 can include a color tape 50 attached to the inner surface of the transparent casing 20 (rear cover, see FIG. 2). The illuminator 15 is configured for illuminating the color tape 50 on the inner surface of the rear cover, resulting in color changeable for the rear cover. Therefore, the illuminator 15 does not need to be color changeable.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electronic device comprising:
   a main body comprising at least one illuminator capable of emitting at least one color light and a key connected to the at least one illuminator for switching on/off the at least one illuminator;
   a transparent casing covering the main body, the at least one illuminator configured for illuminating the transparent casing using the at least one color light; and
   a reflective film attached to the surface of the transparent casing and configured for reflecting the light emitted from the at least one illuminator;
   wherein the main body further comprises a securing shell, the securing shell defines a plurality of latching grooves, the transparent casing comprises a plurality of catches engagingly received in the latching grooves.

2. The electronic device in claim 1, wherein the transparent casing comprises a top portion and a plurality of side portions, the top portion is parallel to the main body, the side portions are substantially perpendicular to the main body, a plurality of curved portions are formed between the side portions and the top portion, the reflective film is attached to at least one of the inner surfaces and the outer surfaces of the curved portions.

3. The electronic device in claim 1, wherein the reflective film is attached to the transparent casing by adhesive or static electricity.

4. The electronic device in claim 1, wherein the main body further comprises a motherboard, wherein the motherboard comprises a control circuit electrically connects the at least one illuminator to the key.

5. The electronic device in claim 4, wherein the at least one illuminator comprises a red illuminator for emitting red light, a green illuminator for emitting green light, a dial key and a hang-up key, the green illuminator is connected to the dial key and the red illuminator is connected to the hang-up key.

6. An electronic device comprising:
   a main body;
   an illuminator received within the main body;
   a transparent rear cover attached to the main body, the main body and the rear cover cooperatively defining a compartment for receiving a battery therein;
   a color tape attached to the inner surface of the rear cover, the illuminator configured for illuminating the color tape on the inner surface of the rear cover;
   a key arranged on the main body and connected to the illuminator for switching on/off the illuminator; and
   a reflective film adhered to the rear cover, wherein the rear cover comprises a covered portion with the reflective film attached thereon and an exposed portion free of the reflective film attached thereon.

* * * * *